United States Patent
Bosler et al.

[11] Patent Number: 5,906,840
[45] Date of Patent: May 25, 1999

[54] APPARATUS FOR CONTINUOUS VACUUM FORMING

[75] Inventors: Kenneth Bosler, Holland; Robert Bosler, Langhorne; Ralph Bosler, Holland, all of Pa.

[73] Assignee: Bosler Designs Inc., Warminster, Pa.

[21] Appl. No.: 08/916,876

[22] Filed: Aug. 22, 1997

[51] Int. Cl.⁶ .................................................. B29C 41/28
[52] U.S. Cl. .................. 425/388; 264/555; 425/DIG. 44
[58] Field of Search ................................ 425/384, 224, 425/388, DIG. 44; 198/847; 355/76; 93/51 M; 264/320, 555

[56] References Cited

U.S. PATENT DOCUMENTS

| | | | |
|---|---|---|---|
| 3,648,573 | 3/1972 | Le Febvre et al. | 93/51 M |
| 3,966,383 | 6/1976 | Bussey, Jr. et al. | 425/388 |
| 3,982,868 | 9/1976 | Rinker | 425/223 |
| 4,004,870 | 1/1977 | Guttinger et al. | 425/224 |
| 4,294,540 | 10/1981 | Thettu | 355/76 |
| 4,532,098 | 7/1985 | Campbell et al. | 264/320 |
| 5,004,098 | 4/1991 | Marshall | 198/847 |
| 5,314,325 | 5/1994 | Bosler | 425/384 |

*Primary Examiner*—Robert Davis
*Attorney, Agent, or Firm*—Mathews, Collins, Shepherd & Gould, P.A.

[57] ABSTRACT

An apparatus for continuous vacuum forming a material having a flexible patterned belt continuously rotatable with a flat support belt over a vacuum manifold. The flexible patterned belt includes apertures therein and the support belt includes perforations therein for drawing air therethrough. The material is drawn onto the flexible patterned belt for vacuum forming the material. The flat support belt provides improved stability of the flexible patterned belt and improved vacuum characteristics between the belts

9 Claims, 3 Drawing Sheets

APPARATUS FOR CONTINUOUS VACUUM FORMING

BACKGROUND OF THE INVENTION

1. Field of the Invention

The present invention relates to an apparatus for continuous vacuum forming of a plasticized material in which a flexible patterned belt having apertures therein is continuously rotatable with a perforated flat support belt over a vacuum chamber to provide improved stability of the belts and improved vacuum characteristics between the belts and the material.

2. Description of the Prior Art

Prior art apparatus for continuous forming of molded plastic sheets have used a continuously moving conveyor belt where the sheet is vacuum formed. As described in U.S. Pat. No. 3,982,868, an extruder deposits a thermoplastic material to an endless conveyor belt mold. The conveyor belt mold is made of a flexible material contoured with the grooved design shown on the product. The conveyor belt mold has a plurality of holes therethrough to provide means for exerting a vacuum onto the thermoplastic material received by the belt. A vacuum box located beneath the conveyor belt mold provides means which exerts suction on the thermoplastic material to shape the material into the mold design of the surface.

U.S. Pat. No. 3,966,383 describes an apparatus for producing an embossed thermoplastic sheet in which an endless, seamless screen is used as the embossing surface. The screen is rotated by a plurality of rotatable rolls. The perforated screen is advanced at the same rate as a heated film. A vacuum assembly applies a vacuum to a part of the undersurface of the perforated screen to pull the heated film into contact with the upper surface of the screen to cause the film to assume the shape provided on the top surface of the screen or belt. The vacuum assembly includes a vacuum manifold connected to end plates. Seal rolls are rotatably supported which contact the underside of the screen. Two movable seal members are connected to the end plates adjacent the seal rolls for making sliding sealing contact with the manifold, seal rolls and the underside of the screen. The seal rolls can be constructed from a fluorine containing polymeric material such as Teflon®. The above described patents use of a single conveyor belt has the shortcoming of frequent breakage of the belt during application of the vacuum to the belt. Also, the use of a single conveyor belt has the disadvantage that the outside surface of the belt tends move faster than its inside surface creating creep of the belt when vacuum is applied to the belt.

U.S. Pat. No. 5,314,325, issued to one of the inventors of this disclosure, describes a continuous vacuum forming apparatus including a pair of flexible belts for facilitating the vacuum forming operation and providing a flat surface against which the vacuum can be performed. The upper belt is formed of a flexible rubber material and the lower belt is formed of an open weave metallic material to allow air to be drawn therethrough. A flexibly resilient pattern form including a plurality of apertures is applied to the upper belt. The woven support belt is formed of an open weave material including longitudinal and lateral sections impregnated with rubber material which is impervious to air flow. The sections form a plurality of rectangular vacuum sections through which air can pass to the open weave material. The sections concentrate the vacuum into bands or channels. The apertures in the pattern form are in fluid flow communication with the vacuum sections to draw the hot plasticized material onto the patterned form. This patent has the shortcoming that the use of a woven belt with impregnated sections creates a belt which is not completely flat resulting in loss of vacuum around the raised surfaces. Also, the use of broad channels for vacuum creates sections along the belt without vacuum.

SUMMARY OF THE INVENTION

The present invention relates to an apparatus for vacuum forming a material in which a flexible patterned belt having apertures therein is continuously rotatable with a flat support belt having perforations therein. The flat support belt is fitted over rotatable rollers and the patterned belt is fitted over the support belt. The patterned belt receives the material to be vacuum formed. The belts are rotated by the rotatable rollers over a vacuum means. The vacuum means provide a vacuum with the apertures in the flexible material and the perforations in the support belt for drawing the material against the patterned belt. The flat support belt prevents the flexible patterned belt from being unevenly drawn by the vacuum means and provides improved vacuum characteristics between the belts.

Preferably, the flexible patterned belt is formed of a rubber or rubberized material. The support belt can be preferably formed of a metal material such as stainless steel. A grooved sheet can form or be attached to the top surface of the vacuum means for forming vacuum along the grooves. The grooves are in fluid flow communication with the perforations in the support belt. Preferably, the grooved sheet is formed of a material having a low coefficient of friction such as a fluorine containing polymeric material.

The invention will be more fully described by reference to the following drawings.

DETAILED DESCRIPTION OF THE PREFERRED EMBODIMENT

During the course of this description, like numbers will be used to identify like elements according to the different figures which illustrate the invention.

Figure 1:
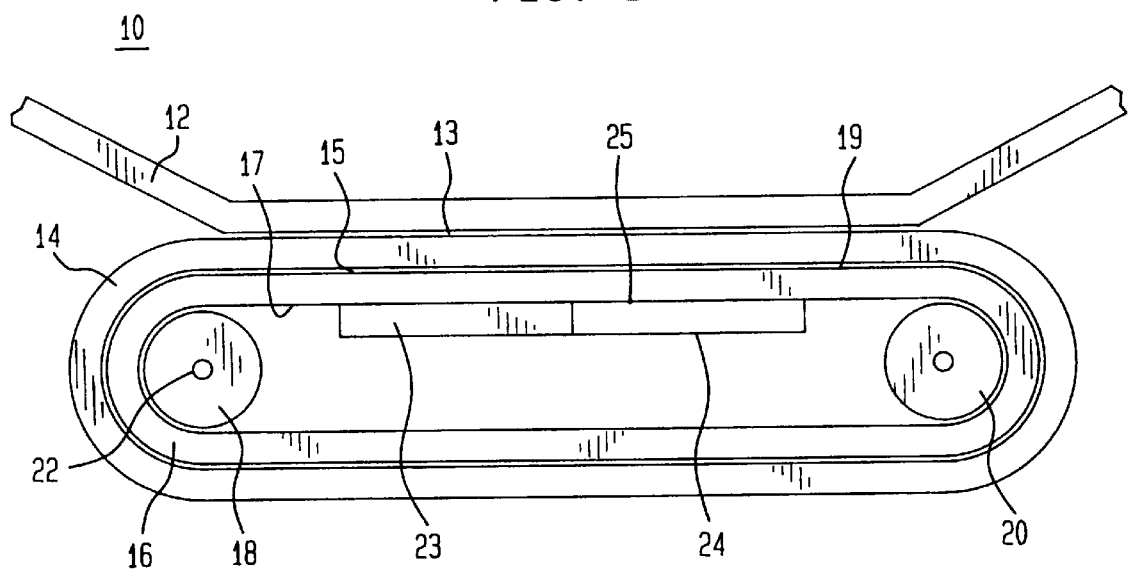
FIG. 1 illustrates a schematic diagram of an apparatus for continuous vacuum forming a material in accordance with the teachings of the present invention.

FIG. 1 illustrates an apparatus for continuous vacuum forming a material 10 in accordance with the teachings of the present invention. Sheet of material 12 is extruded onto the apparatus for vacuum forming a material 10. The sheet of material 12 can be any plasticized melt of a suitable polymer such as vinyl, polyethylene and polypropylene.

Sheet of material 12, while it is still hot from extrusion, is applied to top surface 13 of a flexible patterned belt 14. Support belt 16 is positioned underneath flexible patterned belt 14 and upper surface 19 contacts bottom surface 15 of flexible patterned belt 14. Flexible patterned belt 14 and support belt 16 extend around rollers 18 and 20. Rollers 18 and 20 are driven by driving means 22 to make rolling contact with bottom surface 17 of support belt 16. Vacuum means 23 applies a vacuum through vacuum manifold 24 to an area 25 between rollers 18 and 20.

Figure 2:
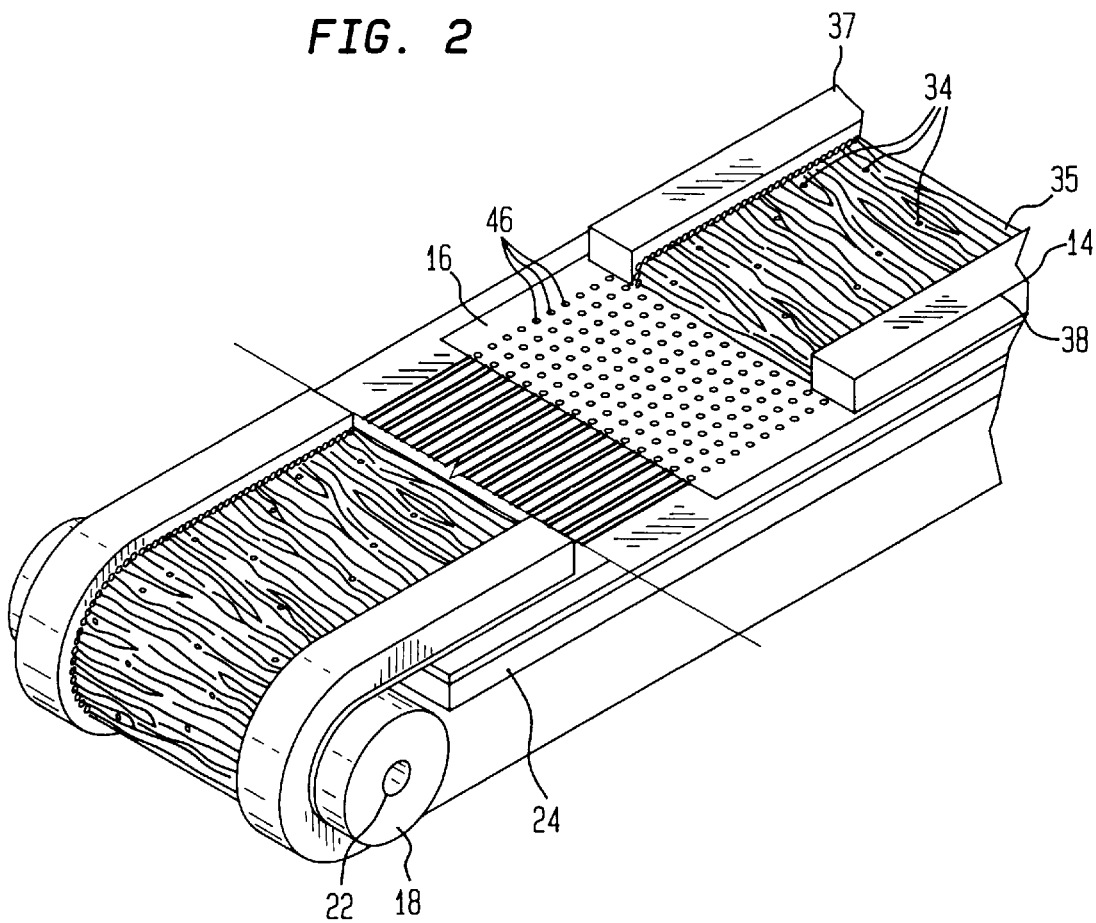
FIG. 2 illustrates a side perspective view of a flexible patterned belt and support belt of the present invention.

Preferably, flexible patterned belt 14 is formed of a rubber material or a rubberized material. Most preferably flexible patterned belt 14 is formed of silicon rubber. A pattern 35 is formed between edges sections 37 and 38, as shown in FIG. 2. For example, pattern 35 can resemble a grained textured surface with raised and depressed surface areas such as is used in vinyl siding applications. A plurality of apertures 34 are formed in flexible patterned belt 14. During vacuum forming, pattern 35 forms a grooved surface in material 12 to form a grained product which is particularly advantageous in vinyl siding products. Apertures 34 are preferably placed at inconspicuous locations in pattern 35 such that are dimples and raised surface areas not observable on the formed plasticized product.

Support belt 16 is preferably formed of a flat perforated metal material. For example, metal materials useful for forming support belt 16 include stainless steel, aluminum and nickel. A plurality of perforations 46 can be formed in support belt 16. For example, perforations 46 can have a diameter of about 1/32 of an inch to about 1/16 of an inch and can have a spacing between each perforation of about 1/4 inch to about 1/2 inch. Apertures 34 are in fluid flow communication with perforations 46 to facilitate drawing of material 12 onto top surface 13 of flexible patterned 14 belt by vacuum means 23. It will be appreciated that flexible patterned belt 14 and support belt 16 can be used to replace the respective flexible belt and vacuum support belt described in U.S. Pat. No. 5,314,325, the details of which are herein incorporated by reference into this application.

Figure 3:
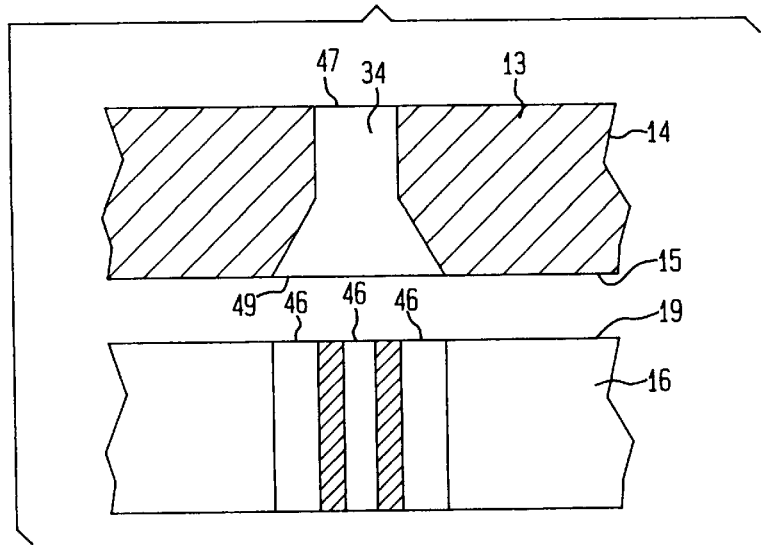
FIG. 3 illustrates a cross sectional view of an embodiment of the flexible patterned belt and the support belt.

Apertures 34 of flexible patterned belt 14 can have a tapered shape, as shown in FIG. 3. The diameter of opening 49 exiting bottom surface 15 of flexible patterned belt 14 is greater than the diameter of opening 47 exiting top surface 13 of flexible patterned belt 14. The tapered shape allows aperture 34 to have fluid flow communication with a plurality of perforations 46 in support belt 16.

Figure 4:
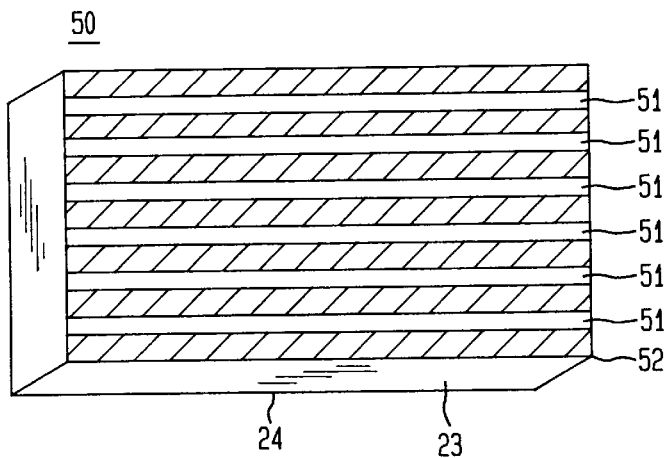
FIG. 4 illustrates a perspective view of an embodiment of a vacuum means of the present invention.

Grooved sheet 50 can form or be attached to the top surface 52 of vacuum manifold 24, as shown in FIG. 4. A plurality of grooves 51 are formed in grooved sheet 50. Vacuum means 23 forms a vacuum along grooves 51. Grooves 51 are in fluid flow communication with perforations 46 of support belt 16. Preferably, grooved sheet 50 is formed of a material having a low coefficient of friction for reducing friction between support belt 16 and vacuum manifold 24. For example, grooved sheet 50 can be formed of a fluorine containing polymeric material such as polytetrafluorine ethylene, known as Teflon®. Teflon® is a registered trademark of DuPont. Grooved sheet 50 provides increased areas of vacuum in comparison to prior art vacuum means such as are disclosed in U.S. Pat. No. 5,314,325.

Figure 5:
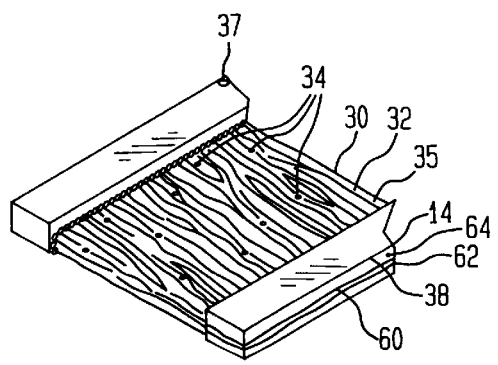
FIG. 5 illustrates a side elevational view of an embodiment of the flexible patterned belt of the present invention.

In a preferred embodiment, flexible patterned belt 14 is formed with improved stability by including a woven layer 60 therein, as shown in FIG. 5. Woven layer 60 is positioned between lower layer 62 and upper layer 64. Woven layer 60 can be formed of a nylon or fiberglass mesh material. For example, woven layer 60 can be formed of Kevlar®. Kevlar® is a registered Trademark of DuPont. Lower layer 62 and upper layer 64 can be formed of rubber or a rubberized material, for example silicone. Woven layer 60 provides strength and integrity to flexible patterned belt 14 to reduce deformation or breakage of flexible patterned belt 14 during application of vacuum.

In general, the present invention has the advantage that the use of a support belt reduces stress on the flexible patterned belt during vacuum forming a material on flexible patterned belt. In addition, the use of a flat support belt reduces leakage of vacuum between the belts.

It is to be understood that the above-described embodiments are illustrative of only a few of the many possible specific embodiments which can represent applications of the principles of the invention. Numerous and varied other arrangements can be readily devised in accordance with these principles by those skilled in the art without departing from the spirit and scope of the invention.

We claim:

1. An apparatus for continuous vacuum forming a material comprising:

a pair of spaced apart rotatable rollers;

a support belt being fitted over said pair of rotatable rollers and being rotated by said rollers, said support belt being flat and having perforations spaced along the length and width thereof; and a flexible patterned belt being fitted over said support belt and being rotated with said support belt, said flexible patterned belt comprising a patterned section along the length thereof and laterally between a pair of raised edge sections and having apertures spaced along the length and width thereof; and vacuum means positioned adjacent said support belt, wherein said vacuum means is in fluid flow communication with said perforations of said support belt and said apertures of said flexible patterned belt for drawing the material onto said flexible patterned belt.

2. The apparatus of claim 1 wherein said apertures are positioned in predetermined positions along said patterned section which are inconspicuous in formed material exiting said apparatus.

3. The apparatus of claim 1 wherein said apertures have a tapered shape, said apertures being in fluid flow communication with a plurality of said perforations.

4. The apparatus of claim 1 wherein said flexible patterned belt is formed of a rubberized material.

5. The apparatus of claim 4 wherein said flexible patterned belt is formed of a woven layer positioned within said rubberized material.

6. The apparatus of claim 1 wherein said support belt is formed of a metal material.

7. The apparatus of claim 6 wherein said metal material is stainless steel.

8. The apparatus of claim 1 further comprising:

a sheet having grooves therein coupled to an upper surface of said vacuum means, wherein a vacuum is formed in said grooves of said sheet, said grooves of said sheet being in communication with said perforations of said support belt.

9. The apparatus of claim 8 wherein said sheet is formed of a fluorine containing polymeric material.

* * * * *